(12) United States Patent
Zhao et al.

(10) Patent No.: US 12,109,997 B2
(45) Date of Patent: Oct. 8, 2024

(54) PATH TRACKING CONTROL METHOD AND DEVICE FOR INTELLIGENT ELECTRIC VEHICLES

(71) Applicant: CHANG'AN UNIVERSITY, Xi'an (CN)

(72) Inventors: Xuan Zhao, Xi'an (CN); Shu Wang, Xi'an (CN); Jian Ma, Xi'an (CN); Rui Liu, Xi'an (CN); Yilin He, Xi'an (CN); Chenyu Zhou, Xi'an (CN)

(73) Assignee: CHANG'AN UNIVERSITY, Xi'an (CN)

( * ) Notice: Subject to any disclaimer, the term of this patent is extended or adjusted under 35 U.S.C. 154(b) by 0 days.

(21) Appl. No.: 18/625,974

(22) Filed: Apr. 3, 2024

(65) Prior Publication Data

US 2024/0253604 A1 Aug. 1, 2024

Related U.S. Application Data

(63) Continuation of application No. PCT/CN2023/118321, filed on Sep. 12, 2023.

(30) Foreign Application Priority Data

Nov. 29, 2022 (CN) .......................... 202211509662.2

(51) Int. Cl.
*B60W 30/02* (2012.01)
*B60T 8/1755* (2006.01)

(52) U.S. Cl.
CPC ...... *B60T 8/17551* (2013.01); *B60T 8/17552* (2013.01)

(58) Field of Classification Search
USPC ...................................................... 701/70–98
See application file for complete search history.

(56) References Cited

U.S. PATENT DOCUMENTS 5,742,917 A * 4/1998 Matsuno ............ B60K 23/0808
701/88
2003/0163237 A1 8/2003 Kim
(Continued)

FOREIGN PATENT DOCUMENTS

| CN | 109795502 A | 5/2019 |
| CN | 110979303 A | 4/2020 |

(Continued)

OTHER PUBLICATIONS

Mingyang Wu et al., "Yaw moment control of electric vehicles based on model predictive theory using Laguerre functions", Journal of Chongqing University, Jan. 15, 2018, vol. 41, No. 1, pp. 61-69.

(Continued)

*Primary Examiner* — Jonathan L Sample

(57) ABSTRACT

A path tracking control method for an intelligent electric vehicle. The method includes the following steps. A lateral stability state of a vehicle is determined, where the lateral stability state includes a stable state, a critical-destabilized state, and a destabilized state. Path tracking control is performed on the vehicle according to the lateral stability state of the vehicle. This application also provides a path tracking control device for an intelligent electric vehicle, which includes a lateral stability state determination module and a path tracking control module.

9 Claims, 2 Drawing Sheets

(56) References Cited

U.S. PATENT DOCUMENTS

| | | | | |
|---|---|---|---|---|
| 2010/0211256 | A1* | 8/2010 | Takenaka | B60T 8/172 701/31.4 |
| 2017/0291638 | A1 | 10/2017 | Gupta | |
| 2021/0188252 | A1* | 6/2021 | Lu | B60W 40/12 |
| 2021/0213935 | A1* | 7/2021 | Lu | B60W 10/18 |
| 2022/0185293 | A1* | 6/2022 | Choi | B60W 40/109 |
| 2022/0379893 | A1* | 12/2022 | Li | G08G 1/167 |

FOREIGN PATENT DOCUMENTS

| | | |
|---|---|---|
| CN | 110979304 A | 4/2020 |
| CN | 111923908 A | 11/2020 |
| CN | 112440979 A | 3/2021 |
| CN | 112572410 A | 3/2021 |
| CN | 112606826 A | 4/2021 |
| CN | 112644457 A | 4/2021 |
| CN | 112793560 A | 5/2021 |
| CN | 113320542 A | 8/2021 |
| CN | 114454871 A | 5/2022 |
| CN | 114572191 A | 6/2022 |
| CN | 114734983 A | 7/2022 |
| CN | 114802200 A | 7/2022 |
| CN | 115805939 A | 3/2023 |
| EP | 3805057 A1 | 4/2021 |
| KR | 101558761 B1 | 10/2015 |

OTHER PUBLICATIONS

Yihu Wu et al., "A Simulation of Fuzzy Control to Improve Vehicle Yaw Stability Combined Yaw Moment Control and Active Front Steering", Computing Technology and Automation, Dec. 15, 2007, vol. 26, No. 4, pp. 34-40.

Long Chen et al., "Stable Tracking Control of Autonomous Vehicles at Extreme Conditions", Automotive Engineering, Aug. 25, 2020, vol. 42, No. 8, pp. 1016-1026.

* cited by examiner

PATH TRACKING CONTROL METHOD AND DEVICE FOR INTELLIGENT ELECTRIC VEHICLES

CROSS-REFERENCE TO RELATED APPLICATIONS

This application is a continuation of International Patent Application No. PCT/CN2023/118321, filed on Sep. 12, 2023, which claims the benefit of priority from Chinese Patent Application No. 202211509662.2, filed on Nov. 29, 2022. The content of the aforementioned application, including any intervening amendments thereto, is incorporated herein by reference in its entirety.

TECHNICAL FIELD

This application relates to intelligent electric vehicles, and more specifically to a path tracking control method and device for intelligent electric vehicles.

BACKGROUND

Modern automobiles have entered the era of intelligent technology. Intelligent electric vehicles can substitute the drive to complete a series of driving tasks through sensor perception, vehicle networking technology, and decision-making and planning control. Among them, path tracking control is an important part of realizing intelligent technology, which can be achieved by controlling the longitudinal and lateral movements of the vehicle to allow it to follow the desired trajectory.

During the path tracking process, the stability of the vehicle may be affected by speed and road environment factors, which may lead to accidents such as sideslip and tailgate. Especially when the vehicle is in the emergency obstacle-avoiding state, the lateral movement of the vehicle is violent due to the high speed and large steering angle, easily posing dangerous conditions, such as destabilization. At the same time, the violent swing movement will also affect the effect of trajectory tracking, resulting in the vehicle deviating from the expected trajectory, thereby leading to traffic accidents, such as collisions.

SUMMARY

An objective of the present disclosure is to provide a path tracking control method and device for intelligent electric vehicles to solve at least one of the above technical problems.

Technical solutions of the present disclosure are as follows.

In a first aspect, this application provides a path tracking control method for an intelligent electric vehicle, comprising:

determining a lateral stability state of a vehicle, wherein the lateral stability state comprises a stable state, a critical-destabilized state, and a destabilized state;

performing path tracking control on the vehicle according to the lateral stability state of the vehicle;

determining, when the vehicle is in the stable state, a front wheel steering increment of the vehicle; and determining a front wheel steering of the vehicle based on the front wheel steering increment of the vehicle;

determining, when the vehicle is in the critical-destabilized state, a first yaw moment increment and an additional yaw moment weighting coefficient of the vehicle;

determining a first additional yaw moment based on the first yaw moment increment and the additional yaw moment weighting coefficient; and determining a first longitudinal force on each wheel of the vehicle based on the first additional yaw moment; and determining, when the vehicle is in the destabilized state, a second yaw moment increment of the vehicle; determining a second additional yaw moment based on the second yaw moment increment; and determining a second longitudinal force on each wheel based on the second additional yaw moment.

In an embodiment, the stable state is determined by $$0 < \left| \frac{1}{c}\dot{\beta} + \frac{k}{c}\beta \right| \leq \mu;$$

the critical-destabilized state is determined by $$\mu < \left| \frac{1}{c}\dot{\beta} + \frac{k}{c}\beta \right| \leq 1;$$

and the destabilized state is determined by $$\left| \frac{1}{c}\dot{\beta} + \frac{k}{c}\beta \right| > 1;$$

wherein $\beta$ represents a center-of-mass sideslip angle of the vehicle; $\dot{\beta}$ represents a center-of-mass sideslip angular velocity; k represents a slope; c is constant; and $\mu$ represents a road surface adhesion coefficient.

In an embodiment, when the vehicle is in the stable state, the front wheel steering increment of the vehicle is determined through steps of:

constructing an objective function J:

$$\min J = \sum_{j=i+1}^{N_p} \eta(t+j \mid t) - \eta_{ref}(t+j \mid t)Q^2 + \sum_{i=0}^{N_c-1} \Delta u(t+i \mid t)R^2 + l\varepsilon^2;$$

wherein $N_p$ represents a prediction time domain; $N_c$ represents a control time domain; t represents a current moment; $\eta(t+j|t)$ represents a lateral position coordinate of the vehicle at a $(t+j)^{th}$ moment when the current moment is t; $\eta_{ref}(t+j|t)$ represents a reference value of the lateral position coordinate at the $(t+j)^{th}$ moment when the current moment is t; Q, R, and l represent weighting matrices of an output, a control increment, and a relaxation factor, respectively; E represents the relaxation factor; and $\Delta u(t+i|t)$ represents a front wheel steering increment of the vehicle at a $(t+i)^{th}$ moment when the current moment is t;

solving the objective function J; and determining a front wheel steering increment $\Delta u(t+i|t)$ of the vehicle at each moment within the control time domain when the objective function J reaches a minimum value; and acquiring a front wheel steering u(t) of the vehicle at the current moment t based on a front wheel steering increment $\Delta u(t+0|t)$ at a $(t+0)^{th}$ moment within the control time domain:

$$u(t)=u(t-1)+\Delta u(t+0|t).$$

In an embodiment, when the vehicle is in the critical-destabilized state, the first yaw moment increment is determined through steps of constructing an objective function J:

$$\min J = \|Y(k) - Y_{ref}(k)\|_Q^2 + \|\Delta U(k)\|_R^2 =$$
$$\sum_{j=i+1}^{N_p} \|Y(k+j|k) - Y_{ref}(k+j|k)\|_Q^2 + \sum_{i=0}^{N_c-1} \|\Delta u(k+i|k)\|_R^2;$$

wherein $N_p$ represents a prediction time domain; $N_c$ represents a control time domain; Y(k) represents a predicted value of an output of the vehicle in the prediction time domain $N_p$; k represents a current moment; $Y_{ref}(\ )$ represents a reference value of the output; $\Delta U(k)$ represents a sequence of a yaw moment increment at a current moment k; Y(k+j|k) represents a predicted value of the output at a $(k+j)^{th}$ moment when the current moment is k; $Y_{ref}(k+j|k)$ represents a reference value of the output at the $(k+j)^{th}$ moment when the current moment is k; $\Delta u(k+i|k)$ represents a yaw moment increment at a $(k+i)^{th}$ moment when the current moment is k; and Q and R represent weight matrices of the output and a control increment, respectively;

solving the objective function J; and determining the yaw moment increment $\Delta u(k+i|k)$ at each moment within the control time domain when the objective function J takes a minimum value.

In an embodiment, when the vehicle is in the critical-destabilized state, the additional yaw moment weighting coefficient is determined through steps of constructing a coordination controller based on a reinforcement learning deep deterministic policy gradient (DDPG) algorithm, wherein state inputs are yaw velocity $w_r$, center-of-mass sideslip angle β, lateral displacement Y, heading angle φ, front wheel steering angle $δ_f$ and lateral acceleration $α_y$, and an action output is the additional yaw moment weighting coefficient α;

wherein a reward function of the coordination controller is as follows:

$$r = r_1 + r_2 + r_3;$$

wherein $r_1 = -(e_y^2 + e_\varphi^2) + C_1; r_2 = -\left|\frac{1}{c}\dot{\beta} + \frac{k}{c}\beta\right| + C_2; r_3 = -|a_y| + C_3;$ $e_y$ represents a deviation between an actual lateral displacement of the vehicle and a reference path; $e_\varphi$ represents a deviation between the heading angle and a reference heading angle; $α_y$ represents a lateral acceleration of the vehicle; $C_1$, $C_2$, and $C_3$ are constant; c represents a coefficient; k represents a slope; $\dot{\beta}$ represents a center-of-mass sideslip angular velocity of the vehicle; and β represents a center-of-mass sideslip angle of the vehicle.

In an embodiment, the path tracking control is performed through steps of acquiring a yaw moment u(k) at a current moment k based on a yaw moment increment $\Delta u(k+0|k)$ at a $(k+0)^{th}$ moment;

wherein $u(k)=u(k-1)+\Delta u(k+0|k)$;

determining an additional yaw moment ΔM according to the yaw moment u(k) and the additional yaw moment weighting coefficient α;

wherein ΔM=αu(k); and determining a longitudinal force on each wheel of the vehicle based on the additional yaw moment ΔM in a drive-brake-combined manner.

In an embodiment, when the vehicle is in the destabilized state, the second yaw moment increment of the vehicle is determined, and the path tracking control is performed based on the second yaw moment increment through steps of:

constructing an objective function J:

$$\min J = \|Y(k) - Y_{ref}(k)\|_Q^2 + \|\Delta U(k)\|_R^2 =$$
$$\sum_{j=i+1}^{N_p} \|Y(k+j|k) - Y_{ref}(k+j|k)\|_Q^2 + \sum_{i=0}^{N_c-1} \|\Delta u(k+i|k)\|_R^2;$$

wherein $N_p$ represents a prediction time domain; $N_c$ represents a control time domain; Y(k) represents a predicted value of an output of the vehicle in the prediction time domain $N_p$; k represents a current moment; $Y_{ref}(\ )$ represents a reference value of the output; $\Delta U(k)$ represents a sequence of a yaw moment increment at a current moment k; Y(k+j|k) represents a predicted value of the output at a $(k+j)^{th}$ moment when the current moment is k; $Y_{ref}(k+j|k)$ represents a reference value of the output at the $(k+j)^{th}$ moment when the current moment is k; $\Delta u(k+i|k)$ represents a yaw moment increment at a $(k+i)^{th}$ moment when the current moment is k; and Q and R represent weight matrices of the output and a control increment, respectively;

solving the objective function J; and determining the yaw moment increment $\Delta u(k+i|k)$ at each moment within the control time domain when the objective function J takes a minimum value;

acquiring a yaw moment u(k) at a current moment k based on a yaw moment increment $\Delta u(k+0|k)$ at a $(k+0)^{th}$ moment;

wherein $u(k)=u(k-1)+\Delta u(k+0|k)$;

determining an additional yaw moment ΔM according to the yaw moment u(k) and the additional yaw moment weighting coefficient α;

wherein ΔM=αu(k); and determining a longitudinal force on each wheel of the vehicle based on the additional yaw moment ΔM in a drive-brake-combined manner.

In a second aspect, this application provides a path tracking control for an intelligent electric vehicle, comprising:

a lateral stability state determination module; and a path tracking control module;

wherein the lateral stability state determination module is configured to determine a lateral stability state of a vehicle, wherein the lateral stability state comprises a stable state, a critical-destabilized state, and a destabilized state; and the path tracking control module is configured to perform path tracking control on the vehicle according to the lateral stability state of the vehicle, determine a front wheel steering increment of the vehicle when the vehicle is in the stable state, determine a front wheel steering of the vehicle based on the front wheel steering increment of the vehicle, determine a first yaw moment increment and an additional yaw moment weighting coefficient of the vehicle when the vehicle is in the critical-destabilized state, determine a first additional yaw moment based on the first yaw moment increment and the additional yaw moment weighting coefficient, determine a first longitudinal force on each wheel of the vehicle based on the first additional yaw moment, determine a second yaw moment increment of the vehicle when the vehicle is in the destabilized state, determine a second additional yaw moment based on the second yaw moment increment, and determine a second longitudinal force on each wheel based on the second additional yaw moment.

In a third aspect, this application provides a computer-readable storage medium, wherein the computer-readable storage medium is configured to store a computer program; and the computer program is configured to be executed by a processor to implement the aforementioned path tracking control method.

In a fourth aspect, the present disclosure provides a computer program product, comprising a computer program or a computer instruction, wherein the computer program or the computer instruction is configured to be executed by a processor to implement the aforementioned path tracking control method.

Compared with the prior art, the present application has at least the following beneficial effects. The present application introduces a method for judging the stability state of the vehicle, which effectively improves the conflict between the front wheel steering and the additional yaw moment on control of the vehicle, takes into account the stability control of the vehicle while maintaining the path tracking accuracy, and improves the safety of the intelligent electric vehicle.

BRIEF DESCRIPTION OF THE DRAWINGS

The present application may be better understood with reference to the following description in conjunction with the accompanying drawings, which are included in and form a part of this specification.

DETAILED DESCRIPTION OF EMBODIMENTS

Exemplary embodiments of the present application will be described below with reference to the accompanying drawings. For the sake of clarity and brevity, not all features of the actual embodiments are described in the specification. However, it should be understood that many decisions specific to embodiment can be made during the development of any such practical embodiments to achieve the specific goals of the developer, and these decisions may vary from embodiment to embodiment.

Furthermore, to avoid obscuring the present application with unnecessary details, only the structure closely related to the embodiments according to the present application is shown in the accompanying drawings, and other details less relevant to the present application have been omitted.

It should be understood that the present application is not limited to the form of embodiment described with reference to the accompanying drawings below. As far as practicable herein, embodiments may be combined with each other, features can be substituted or borrowed between different embodiments, and one or more features can be omitted in one embodiment.

Figure 1:
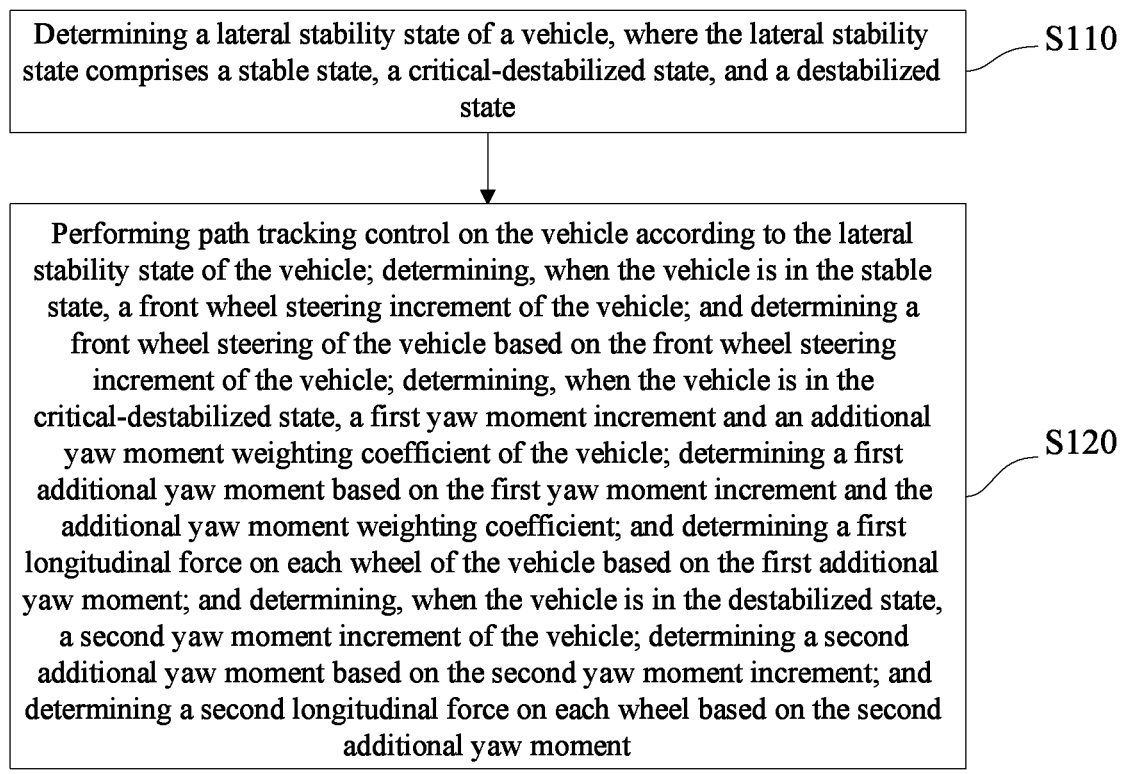
FIG. 1 is a flow chart of a path tracking control method for an intelligent electric vehicle according to an embodiment of the present disclosure.

FIG. 1 is a flow chart of a path tracking control method for an intelligent electric vehicle. Referring to FIG. 1, the path tracking control method includes the following steps.

(S110) A lateral stability state of a vehicle is determined, where the lateral stability condition monitoring function of the vehicle is turned on, and the lateral stability state includes a stable state, a critical-destabilized state, and a destabilized state.

In this step, the lateral stability state of the vehicle is determined through a center-of-mass sideslip angle-sideslip angular velocity phase plane method. Specifically, the stable state is determined by $$0 < \left| \frac{1}{c}\dot{\beta} + \frac{k}{c}\beta \right| \leq \mu;$$

the critical-destabilized state is determined by $$\mu < \left| \frac{1}{c}\dot{\beta} + \frac{k}{c}\beta \right| \leq 1;$$

and the destabilized state is determined by $$\left| \frac{1}{c}\dot{\beta} + \frac{k}{c}\beta \right| > 1;$$

where β represents a center-of-mass sideslip angle of the vehicle; $\dot{\beta}$ represents a center-of-mass sideslip angular velocity; k represents a slope; c is constant; and μ represents a road surface adhesion coefficient.

(S120) Path tracking control is performed on the vehicle according to the lateral stability state of the vehicle. When the vehicle is in the stable state, a front wheel steering increment of the vehicle is determined, and a front wheel steering of the vehicle is determined based on the front wheel steering increment of the vehicle. When the vehicle is in the critical-destabilized state, a first yaw moment increment and an additional yaw moment weighting coefficient of the vehicle are determined, a first additional yaw moment is determined based on the first yaw moment increment and the additional yaw moment weighting coefficient, and a first longitudinal force on each wheel of the vehicle is determined based on the first additional yaw moment. When the vehicle is in the destabilized state, a second yaw moment increment of the vehicle is determined, a second additional yaw moment is determined based on the second yaw moment increment, and a second longitudinal force on each wheel is determined based on the second additional yaw moment.

In an embodiment, the stability state of the vehicle is determined, and then according to the different stability states of the vehicle, different control strategies are adopted to maintain the path tracking accuracy while taking into account the stability control of the vehicle, which improves the safety of the intelligent electric vehicle.

In an embodiment, when the vehicle is in the stable state, the front wheel steering increment of the vehicle is determined, and the front wheel steering is determined based on the front wheel steering increment through the following steps.

Kinematic equations are established as follows, based on the vehicle kinematics model:

$$\begin{cases} \dot{X} = v_r\cos\varphi \\ \dot{Y} = v_r\sin\varphi \\ \dot{\varphi} = \dfrac{v_r\tan\delta_f}{l} \end{cases} \quad (1)$$

where X represents a lateral position coordinate of the vehicle; Y represents a longitudinal position coordinate of the vehicle; φ represents a heading angle of the vehicle; $\dot{X}$, $\dot{Y}$ and $\dot{\varphi}$ are derivatives of lateral position coordinate, the longitudinal position coordinate and the heading angle, respectively; $v_r$ represents a speed of the vehicle; l represents a wheelbase of the vehicle; and $\delta_f$ represents a front wheel steering angle.

The path tracking model is established by the above kinematic equations and the objective function is constructed to solve.

The kinematic equations are represented in state space:

$$\begin{cases} \dot{\xi} = f(\xi, u) \\ \eta = C \cdot \xi \end{cases} \quad (2)$$

where a state variable is represented by $\xi=[X,Y,\varphi]^T$; $\dot{\xi}$ represents a derivative of the state variable ξ; η denotes a lateral position coordinate of the vehicle; and the a control variable is represented by $u=[\delta_f]^T$; $\delta_f$ represents a front wheel steering angle; and $$C = \begin{bmatrix} 1 & 1 & 0 \\ 0 & 1 & 1 \end{bmatrix}.$$

The formula (2) is linearized and discretized to obtain a discrete state space equation as follows:

$$\begin{cases} \tilde{\xi}_{k+1} = \overline{A}_{k,t}\tilde{\xi}_k + \overline{B}_{k,t}\tilde{u}_k \\ \eta = C \cdot \tilde{\xi}_k \end{cases} \quad (3)$$

where $\overline{A}_{k,t}$ represents a matrix of difference coefficients of the state variable at a $k^{th}$ moment when the current moment is t; $\overline{B}_{k,t}$ represents a matrix of difference coefficients of the control variable at the $k^{th}$ moment when the current moment is t;

$$\overline{A}_{k,t} = \begin{bmatrix} 1 & 0 & -Tv_r\sin\varphi \\ 0 & 1 & Tv_r\sin\varphi \\ 0 & 0 & 1 \end{bmatrix}; \overline{B}_{k,t} = \begin{bmatrix} T\cos\varphi & 0 \\ T\sin\varphi & 0 \\ \dfrac{T\tan\delta_f}{l} & \dfrac{Tv_r}{l\cos^2\delta_f} \end{bmatrix};$$

T represents a sampling period; $\tilde{\xi}$ represents a state variable difference, and $\tilde{\xi}=\xi-\xi_r$; $\tilde{u}$ represents a control variable difference, and $\tilde{u}=u-u_r$; $\dot{\xi}_r=f(\xi_r,u_r)$, which is a Taylor expansion point at any point; $\xi_r$ represents a state variable at any point; $u_r$ represents a control variable at any point; $\tilde{\xi}_k$ represents a state variable difference at the $k^{th}$ moment; and $\tilde{u}_k$ represents a control variable difference at the $k^{th}$ moment.

The state variable and the control variable are combined to reconstruct a new state space expression χ(k|t) as follows:

$$\chi(k|t) = [\tilde{\xi}(k|t) u(k-1|t)]^T \quad (4);$$

The equation (4) is substituted into equation (3) to obtain equation (5) as follows.

$$\begin{cases} \chi(k+1|t) = \hat{A}_{k,t}\chi(k|t) + \hat{B}_{k,t}\Delta u(k|t) \\ \eta(k|t) = \hat{C}_{k,t} \cdot \chi(k|t) \end{cases} \quad (5)$$

where $$\hat{A}_{k,t} = \begin{bmatrix} \tilde{A}_{k,t} & \hat{B}_{k,t} \\ O_{m\times n} & I_m \end{bmatrix}; \hat{B}_{k,t} = \begin{bmatrix} \hat{B}_{k,t} \\ I_m \end{bmatrix}; \Delta u(k|t)$$

represents a control variable increment at a $k^{th}$ moment when the current moment is t, and $\Delta u(k|t)=u(k|t)-u(k-1|t)$; η(k|t) represents a lateral position coordinate of the vehicle at the $k^{th}$ moment when the current moment is t;

$$\hat{C}_{k,t} = [C \quad O_{m\times n}];$$

m represents a control variable dimension, and m=1; n represents a state variable dimension, and n=3; $I_m$ represents a unit matrix of m dimensions; and $O_{m\times n}$ represents a 0 matrix of m×n.

To simplify the calculation, the prediction time domain is allowed to be $N_p$, the control time domain is allowed to be $N_c$, and assumptions are made as follows:

$$\begin{cases} \hat{A}_{k,t} = \hat{A}_{t,t}, k = 1, 2, \ldots, t+N_P-1 \\ \hat{B}_{k,t} = \hat{B}_{t,t}, k = 1, 2, \ldots, t+N_P-1 \\ \hat{C}_{k,t} = \hat{C}_{t,t}, k = 1, 2, \ldots, t+N_P-1 \end{cases} \quad (6)$$

An expression for a predicted output of the system in the prediction time domain $N_p$ is derived as follows:

$Y(t) = \Psi\chi(t|t) + \Theta\Delta U(t)$ (7);

in the formula (7), $$Y(k) = \begin{bmatrix} \eta(t|t) \\ \eta(t+1|t) \\ \vdots \\ \eta(t+N_c|t) \\ \vdots \\ \eta(t+N_p|t) \end{bmatrix} \Psi(t) = \begin{bmatrix} \hat{C}_{t,t}\hat{A}_{t,t} \\ \hat{C}_{t,t}\hat{A}_{t,t}^2 \\ \vdots \\ \hat{C}_{t,t}\hat{A}_{t,t}^{N_c} \\ \vdots \\ \hat{C}_{t,t}\hat{A}_{k,t}^{N_p} \end{bmatrix}$$

$$\Theta = \begin{bmatrix} \hat{C}_{t,t}\hat{B}_{t,t} & 0 & \cdots & 0 \\ \hat{C}_{t,t}\hat{A}_{t,t}\hat{B}_{t,t} & \hat{C}_{t,t}\hat{B}_{t,t} & \cdots & 0 \\ \vdots & \vdots & \ddots & \vdots \\ \hat{C}_{t,t}\hat{A}_{t,t}^{N_c-1}\hat{B}_{t,t} & \hat{C}_{t,t}\hat{A}_{t,t}^{N_c-2}\hat{B}_{t,t} & \cdots & \hat{C}_{t,t}\hat{B}_{t,t} \\ \hat{C}_{t,t}\hat{A}_{t,t}^{N_c}\hat{B}_{t,t} & \hat{C}_{t,t}\hat{A}_{t,t}^{N_c-1}\hat{B}_{t,t} & \cdots & \hat{C}_{t,t}\hat{A}_{t,t}\hat{B}_{t,t} \\ \vdots & \vdots & \ddots & \vdots \\ \hat{C}_k\hat{A}_K^{N_p-1}\hat{B}_k & \hat{C}_{t,t}\hat{A}_{t,t}^{N_p-2}\hat{B}_{t,t} & \cdots & \hat{C}_{t,t}\hat{A}_{t,t}^{N_p-N_c-1}\hat{B}_{t,t} \end{bmatrix}.$$

ΔU(t) represents a sequence of control increment corresponding to the current moment t.

During the path tracking control of the vehicle, the state error and the control increment of the model prediction controller at each sampling moment are required to be minimized to obtain the best path tracking performance and driving stability of the vehicle. Therefore, the objective function J of the following form is used:

$$\min J = \sum_{j=i+1}^{N_p} \eta(t+j|t) - \eta_{ref}(t+j|t)Q^2 + \sum_{i=0}^{N_c-1} \Delta u(t+i|t)R^2 + l\varepsilon^2;$$

where $N_p$ represents a prediction time domain; $N_c$ represents a control time domain; t represents a current moment; $\eta(t+j|t)$ represents a lateral position coordinate of the vehicle at a $(t+j)^{th}$ moment when the current moment is t; $\eta_{ref}(t+j|t)$ represents a reference value of the lateral position coordinate at the $(t+j)^{th}$ moment when the current moment is t; Q, R, and l represent weighting matrices of an output, a control increment, and a relaxation factor, respectively; E represents the relaxation factor; and $\Delta u(t+i|t)$ represents a front wheel steering increment of the vehicle at a $(t+i)^{th}$ moment when the current moment is t.

In the actual control process, the control variable and the control increment are required to be limited within a reasonable range with constraint expressions as follows:

$$\begin{cases} u_{min}(t) \le u(t) \le u_{max}(t) \\ \Delta u_{min}(t) \le \Delta u(t) \le \Delta u_{max}(t) \end{cases}; \quad (9)$$

where $u_{min}$ represents the minimum value of the control variable; $u_{max}$ represents the maximum value of the control variable; $\Delta u_{min}$ represents the minimum value of the control increment; and $\Delta u_{max}$ represents the maximum value of the control increment.

After solving the objective function in each control time domain, a series of sequences of increment in the control time domain are obtained, i.e., the front wheel steering increment $\Delta u(t+i|t)$ of the vehicle when the objective function J takes the minimum value.

According to the model predictive control (MPC) principle, only the first element in the sequence of increment is taken as the actual control input increment to act on the system each time, i.e., the front wheel steering increment $\Delta u(t+0|t)$ of the vehicle is selected to act on the system to obtain the front wheel steering u(t) of the vehicle corresponding to the current moment t, so as to realize the path tracking control on the vehicle, where $u(t)=u(t-1)+\Delta u(t+0|t)$.

In an embodiment, when the vehicle is in the critical-destabilized state, a first yaw moment increment and an additional yaw moment weighting coefficient of the vehicle are determined, a first additional yaw moment is determined based on the first yaw moment increment and the additional yaw moment weighting coefficient, and a first longitudinal force on each wheel of the vehicle is determined based on the first additional yaw moment through the following steps.

(1) The First Yaw Moment Increment is Determined.

An additional yaw moment controller is established, and the dynamics equations considering the yaw stability control are as follows:

$$\dot{v} = \frac{\cos\beta}{m}[F_{lf}\cos\delta_f - F_{sf}\sin\delta_f + F_{lr}] + \frac{\sin\beta}{m}(F_{sf}\cos\delta_f + F_{lf}\sin\delta_f + F_{sr}) \quad (10)$$

$$\dot{\beta} = \frac{\cos\beta}{mv}(F_{sf}\cos\delta_f + F_{lf}\sin\delta_f + F_{sr}) - \frac{\sin\beta}{mv}(F_{lf}\cos\delta_f - F_{sf}\sin\delta_f + F_{lr}) - \omega$$

$$\dot{\omega} = \frac{1}{I_Z}(F_{lf}a\sin\delta_f + F_{sf}a\cos\delta_f - F_{sf}b + \Delta M);$$

where β represents a center-of-mass side slip angle of the vehicle; $\dot{\beta}$ represents a center-of-mass side slip angular velocity of the vehicle; ω represents a yaw angular velocity; $\dot{\omega}$ represents a derivative of the yaw angular velocity; ΔM represents a yaw moment; $I_z$ represents a moment of inertia of the vehicle around the z-axis; a and b are distances from the center of mass to the front and rear axes, respectively; $F_{sf}$ and $F_{sr}$ are a lateral force of a front axle and a lateral force of the rear axle, respectively; $F_{lf}$ and $F_{lr}$ are a longitudinal force of the front axle and a longitudinal force of the rear axle, respectively; $\delta_f$ is a steering angle of the front wheel; $\dot{V}$ is a longitudinal acceleration of the vehicle; and m represents a weight of the vehicle.

After linearizing the above dynamics equations, the system state equation is obtained as follows:

$$\begin{cases} \dot{X} = AX + BU + ED \\ Y = CX \end{cases}; \quad (11)$$

where a state variable is represented by $X=[v, \beta, \omega]^T$; an output variable is represented by $Y=[\beta, \omega]^T$; a control variable is represented by $U=[\Delta M]$; an output quantity matrix is expressed as $$C = \begin{bmatrix} 0 & 1 & 0 \\ 0 & 0 & 1 \end{bmatrix}; D = [\delta_f],$$

ω represents a yaw angular velocity; and β represents a center-of-mass sideslip angle of the vehicle.

To simplify the calculation and the control system, the linear continuous system is discretized using the forward Euler method, expressed as:

$$X(k+1)=A_kX(k)+B_kU(k)+E_kD(k) \quad (12);$$

where X(k) is a state variable at a $k^{th}$ moment; X(k+1) is a state variable at a $(k+1)^{th}$ moment; U(k) represents a control variable at the $k^{th}$ moment; D(k) is a front wheel angle at the $k^{th}$ moment; $E_k$ is a parameter matrix of the vehicle at the $k^{th}$ moment; $A_k=I+TA$; $B_k=TB$; T represents a sampling period; I represents a unit matrix. Since the prediction time domain is small, D(k) is considered as constant in the prediction time domain, and does not affect the construction of the objective function. Therefore, the $E_kD(k)$ term can be ignored.

The model predictive model equation is constructed let. Letting $$\xi(k) = \begin{pmatrix} x(k) \\ U(k-1) \end{pmatrix}$$

and $\Delta U(k)=U(k)-U(k-1)$, the state space equation of the predictive model is obtained as follows:

$$\xi(k+1)=\hat{A}_k\xi(k)+\hat{B}_k\Delta U(k)+\hat{E}_kD(k)\eta(k)=C_k\xi(k) \quad (13);$$

where n represents the number of the state variable; m represents the number of the control variable; ξ(k) represents a state variable at a $k^{th}$ moment; and η(k) represents a lateral position coordinate of the vehicle at a $k^{th}$ moment;

where $$\hat{A}_k = \begin{pmatrix} A_k & B_k \\ 0_{m \times n} & I_m \end{pmatrix}_{(n+m) \times (n+m)}, \hat{B}_k = \begin{pmatrix} B_k \\ I_m \end{pmatrix}_{(n+m) \times m},$$

$$C_k = [C \ 0], \hat{E}_k = \begin{pmatrix} E_k \\ I_m \end{pmatrix}_{(n+m) \times m}.$$

In the prediction time domain, the predicted value of the output can be calculated by the following equation:

$$Y(k) = \Psi_k \xi(k) + \Theta_k \Delta U(k) + \Gamma_k D(k) \quad (14);$$

in the formula (14), $$Y(k) = \begin{bmatrix} \eta(k+1) \\ \eta(k+2) \\ \vdots \\ \eta(k+3) \\ \vdots \\ \eta(k+N_p) \end{bmatrix}_{N_p \times 1}$$

$$\Psi(k) = \begin{bmatrix} \hat{C}_k \hat{A}_k \\ \hat{C}_k \hat{A}_k^2 \\ \vdots \\ \hat{C}_k \hat{A}_k^3 \\ \vdots \\ \hat{C}_k \hat{A}_k^{N_p} \end{bmatrix}_{N_p \times 1}$$

$$\Delta U_k = \begin{bmatrix} \Delta u(k) \\ \Delta u(k+1) \\ \Delta u(k+2) \\ \vdots \\ \Delta u(k+N_c-1) \end{bmatrix}_{N_c \times 1}$$

$$\Theta_k = \begin{bmatrix} C_k \hat{B}_k & 0 & \cdots & \cdots & 0 \\ C_k \hat{A}_K \hat{B}_k & C_k \hat{B}_k & \cdots & \cdots & 0 \\ C_k \hat{A}_K^2 \hat{B}_k & C_k \hat{A}_K \hat{B}_k & C_k \hat{B}_k & \cdots & 0 \\ \vdots & \vdots & \vdots & \ddots & \vdots \\ \hat{C}_k \hat{A}_K^{N_p-1} \hat{B}_k & \cdots & \cdots & C_k \hat{A}_K^{N_p-N_c} \hat{B}_k & C_k \hat{B}_k \end{bmatrix}$$

$$\Gamma_k = \begin{bmatrix} C_k \hat{E}_k & 0 & \cdots & \cdots & 0 \\ C_k \hat{A}_K \hat{E}_k & C_k \hat{E}_k & \cdots & \cdots & 0 \\ C_k \hat{A}_K^2 \hat{E}_k & C_k \hat{A}_K \hat{E}_k & C_k \hat{E}_k & \cdots & 0 \\ \vdots & \vdots & \vdots & \ddots & \vdots \\ C_k \hat{A}_K^{N_p-1} \hat{E}_k & \cdots & \cdots & C_k \hat{A}_K^{N_p-N_c} \hat{E}_k & C_k \hat{E}_k \end{bmatrix};$$

where $N_p$ represents a prediction time domain, $N_c$ represents a control time domain, and $N_p \geq N_c$.

The objective function is set as follows to ensure a good control effect while smoothing the input of the control variable:

$$\min J = \|Y(k) - Y_{ref}(k)\|_Q^2 + \|\Delta U(k)\|_R^2 = \quad (15)$$
$$\sum_{j=i+1}^{N_p} \|Y(k+j|k) - Y_{ref}(k+j|k)\|_Q^2 + \sum_{i=0}^{N_c-1} \|\Delta u(k+i|k)\|_R^2;$$

where $N_p$ represents a prediction time domain; $N_c$ represents a control time domain; Y(k) represents a predicted value of an output of the vehicle in the prediction time domain $N_p$, and $$Y(k) = \begin{bmatrix} \eta(k+1) \\ \eta(k+2) \\ \eta(k+3) \\ M \\ \eta(k+N_p) \end{bmatrix}_{N_p \times 1};$$

k represents a current moment; η represents a lateral position coordinate of the vehicle; $Y_{ref}(k)$ represents a reference value of the output; ΔU(k) represents a sequence of a yaw moment increment at a current moment k; Y(k+j|k) represents a predicted value of the output at a $(k+j)^{th}$ moment when the current moment is k; $Y_{ref}(k+j|k)$ represents a reference value of the output at the $(k+j)^{th}$ moment when the current moment is k; Δu(k+i|k) represents a yaw moment increment at a $(k+i)^{th}$ moment when the current moment is k; and Q and R represent weight matrices of the output and a control increment, respectively.

Considering the constraints on the control variable, the limit value of the control increment and the output, the constraints are organized as follows:

$$\begin{cases} U_{min} \leq U(k) \leq U_{max} \\ \Delta U_{min} \leq \Delta U(k) \leq \Delta U_{max} \\ Y_{min} \leq Y(k) \leq Y_{max} \end{cases}.$$

In this model, the prediction time domain $N_p$ is 5; the control time domain $N_c$ is 3;

$$Q = \begin{bmatrix} 10 & 0 \\ 0 & 15 \end{bmatrix}; R = \begin{bmatrix} 500 & 0 & 0 \\ 0 & 5000 & 0 \\ 0 & 0 & 8000 \end{bmatrix};$$

a simulation step T is 0.01 s; a reference value of the output of the vehicle is represented by $Y_{ref} = [\omega_{ref}, \beta_{ref}]$; $\omega_{ref}$ is a reference value of the yaw angular velocity; and $\beta_{ref}$ represents a reference value of center-of-mass sideslip angle of the vehicle, which is calculated by the linear two-degree-of-freedom model.

The objective function J is solved to determine the yaw moment increment Δu(k+i|k) at each moment in the control time domain when the objective function J takes the minimum value.

(2) The Additional Yaw Moment Weighting Coefficient is Determined.

A coordination controller is constructed. Since the path tracking performance of the vehicle will be affected after performing the yaw moment control, the coordination controller is constructed based on a reinforcement learning deep deterministic policy gradient (DDPG) algorithm to coordinate the conflict between the trajectory tracking and the stability control, where state inputs are yaw velocity $w_r$, center-of-mass side slip angle β, lateral displacement Y, heading angle φ, front wheel steering angle $\delta_f$ and lateral acceleration $\alpha_y$; and an action output is the additional yaw moment weighting coefficient α(0<α<1). In this case, the path tracking accuracy can be ensured with a stable control on the vehicle. The design principles of a reward function of the coordination controller are described as follows.

(1) At this time, the vehicle is still not destabilized, and the path tracking requirements should be satisfied first, so let $r_1 = -(e_y^2 + e_\varphi^2) + C_1$.

(2) Since the vehicle is in the critical-destabilized state, to avoid the destabilization of the vehicle, it is necessary to carry out stability control on the vehicle to make it return to the stable state, so let $$r_2 = -\left|\frac{1}{c}\dot{\beta} + \frac{k}{c}\beta\right| + C_2.$$

(3) During stability control, the discomfort to the driver caused by the generation of additional yaw moment should be minimized, so let $r_3 = -|\alpha_y| + C_3$.

Finally, the reward function of the coordination controller is $r = r_1 + r_2 + r_3$;

where $e_y$ represents a deviation between an actual lateral displacement of the vehicle and a reference path; $e_\varphi$ represents a deviation between the heading angle and a reference heading angle; $\alpha_y$ represents a lateral acceleration of the vehicle; $C_1$, $C_2$, and $C_3$ are constant; c represents a coefficient; k represents a slope; $\beta$ represents a center-of-mass sideslip angular velocity of the vehicle; and $\beta$ represents a center-of-mass sideslip angle of the vehicle.

(3) The path tracking control is performed on the vehicle based on the yaw moment increment and the coordinated control weight.

The yaw moment increment $\Delta u(k+0|k)$ at a $(k+0)^{th}$ moment in the control time domain is selected to act on the system to obtain a yaw moment $u(k)$ at a current moment k, where $u(k) = u(k-1) + \Delta u(k+0|k)$.

An additional yaw moment $\Delta M$ is determined according to the yaw moment $u(k)$ and the additional yaw moment weighting coefficient $\alpha$, where $\Delta M = \alpha u(k)$.

(4) A longitudinal force on each wheel of the vehicle is determined based on the additional yaw moment $\Delta M$ in a drive-brake-combined manner.

After obtaining the output additional jaw moment, the drive-brake-combined method is adopted to convert it into longitudinal forces on four wheels of the vehicle. By adopting the combination of driving and braking, the longitudinal force on the four wheels be reasonably utilized, which can avoid the tire wear caused by braking or driving of a single wheel, and ensure that the speed of the vehicle is unchanged during the control process, thereby reducing the burden of the driver. The relationship between the longitudinal forces at the center of each wheel is as follows:

$$\begin{cases} F_{xfl} + F_{xrl} = F_{xfr} + F_{xrr} \\ F_{xfl} = F_{xrl} \\ F_{xfr} = F_{xrr} \end{cases} ;$$

where $F_{xfl}$, $F_{xrl}$, $F_{xfr}$ and $F_{xrr}$ represent longitudinal forces on a left front wheel, a left rear wheel, a right front wheel and a right rear wheel, respectively, and the longitudinal forces on the four wheels satisfy the following constraints:

(1)

$$|\Delta M| = |F_{xfl} + F_{xrl}| \times \frac{d}{2} - |F_{xfr} + F_{xrr}| \times \frac{d}{2},$$

where when $\Delta M > 0$, $F_{xfl} = F_{xrl} < 0$ and $F_{xfr} = F_{xrr} > 0$; when $\Delta M < 0$, $F_{xfl} = F_{xrl} > 0$ and $F_{xfr} = F_{xrr} < 0$; and d represents a wheelbase.

(2) $|F_{xi}| \leq \mu F_{zi}$, where $F_i$ represents a longitudinal force of each wheel; i represents a wheel number, corresponding to the left front wheel, the left rear wheel, the right front wheel and the right rear wheel, respectively; $F_{zi}$ represents a vertical load of each wheel; and $\mu$ represents an adhesion coefficient of road surface.

(3)

$$|F_{xi}| \leq \frac{T_{max}}{r},$$

where $T_{max}$ represents the maximum torque of the motor, and r represents a radius of a wheel.

By using the drive-brake combined strategy, the longitudinal force acting on the center of each wheel can be finally obtained to achieve the distribution of the additional yaw moment.

In an embodiment, when the vehicle is in the destabilized state, the second yaw moment increment of the vehicle is determined, and the path tracking control is performed based on the second yaw moment increment through the following steps.

An objective function J is constructed:

$$\min J = \|Y(k) - Y_{ref}(k)\|_Q^2 + \|\Delta U(k)\|_R^2 = \sum_{j=i+1}^{N_p} \|Y(k+j|k) - Y_{ref}(k+j|k)\|_Q^2 + \sum_{i=0}^{N_c-1} \|\Delta u(k+i|k)\|_R^2;$$

where $N_p$ represents a prediction time domain; $N_c$ represents a control time domain; $Y(k)$ represents a predicted value of an output of the vehicle in the prediction time domain $N_p$; k represents a current moment; $Y_{ref}(\cdot)$ represents a reference value of the output; $\Delta U(k)$ represents a sequence of a yaw moment increment at a current moment k; $Y(k+j|k)$ represents a predicted value of the output at a $(k+j)^{th}$ moment when the current moment is k; $Y_{ref}(k+j|k)$ represents a reference value of the output at the $(k+j)^{th}$ moment when the current moment is k; $\Delta u(k+i|k)$ represents a yaw moment increment at a $(k+i)^{th}$ moment when the current moment is k; and Q and R represent weight matrices of the output and a control increment, respectively.

The objective function J; is solved to determine the yaw moment increment $\Delta u(k+i|k)$ at each moment within the control time domain when the objective function J reaches a minimum value.

The yaw moment increment $\Delta u(k+0|k)$ at a $(k+0)^{th}$ moment in the control time domain is selected to act on the system to obtain a yaw moment $u(k)$ at a current moment k, where $u(k) = u(k-1) + \Delta u(k+0|k)$.

An additional yaw moment $\Delta M$ is determined according to the yaw moment $u(k)$ and the additional yaw moment weighting coefficient $\alpha$, where $\Delta M = \alpha u(k)$.

A longitudinal force on each wheel of the vehicle is determined based on the additional yaw moment $\Delta M$ in a drive-brake-combined manner.

In this embodiment, the specific calculation of the longitudinal force on each wheel of the vehicle refers to the calculation method mentioned in the aforementioned embodiment where the vehicle is in a critical-destabilized state, and will not be repeated herein.

Figure 2:
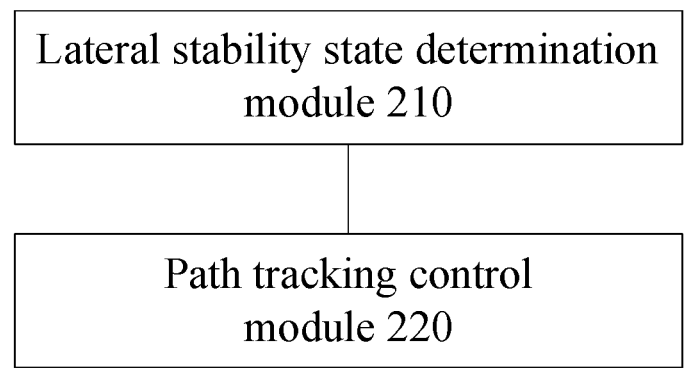
FIG. 2 is a block diagram of a structure of a path tracking control device for an intelligent electric vehicle according to an embodiment of the present disclosure.

Based on the same inventive conception as the aforementioned path tracking control method, the present disclosure also provides a path tracking control device corresponding thereto. FIG. 2 shows a block diagram of a structure of a path tracking control device for an intelligent electric vehicle. The device includes a lateral stability state determination module 210 and a path tracking control module 220.

The lateral stability state determination module 210 is configured to determine a lateral stability state of a vehicle, where the lateral stability state comprises a stable state, a critical-destabilized state, and a destabilized state.

The path tracking control module 220 is configured to perform path tracking control on the vehicle according to the lateral stability state of the vehicle, determine a front wheel steering increment of the vehicle when the vehicle is in the stable state, determine a front wheel steering of the vehicle based on the front wheel steering increment of the vehicle, determine a first yaw moment increment and an additional yaw moment weighting coefficient of the vehicle when the vehicle is in the critical-destabilized state, determine a first additional yaw moment based on the first yaw moment increment and the additional yaw moment weighting coefficient, determine a first longitudinal force on each wheel of the vehicle based on the first additional yaw moment, determine a second yaw moment increment of the vehicle when the vehicle is in the destabilized state, determine a second additional yaw moment based on the second yaw moment increment, and determine a second longitudinal force on each wheel based on the second additional yaw moment.

The present disclosure also provides a computer-readable storage medium. The computer-readable storage medium is configured to store a computer program, and the computer program is configured to be executed by a processor to implement the aforementioned path tracking control method.

The present disclosure also provides a computer program product, which includes a computer program or a computer instruction, where the computer program or the computer instruction is configured to be executed by a processor to implement the aforementioned path tracking control method.

In the embodiments provided herein, it should be understood that the disclosed devices and methods may also be realized in other ways. The device embodiments described above are merely schematic. For example, the flow chart and the block diagram in the accompanying drawings show the architecture, functionality, and operation of possible implementations of devices, methods, and computer program products according to a plurality of embodiments of the present application. In this regard, each box in the flow chart or the block diagram may represent a module, a program segment, or a portion of codes, which contains one or more executable instructions for implementing a prescribed logical function. It should also be noted that in some implementations as substitutions, the functions labeled in the boxes may also occur in a different order than those labeled in the accompanying drawings. For example, two consecutive boxes can actually be executed substantially in parallel, or in reverse order, depending on the involved function. Moreover, each box in the block diagram and/or flowchart, and combinations of boxes in the block diagram and/or flowchart, may be implemented with a specialized hardware-based system that performs the specified function or action, or may be implemented with a combination of specialized hardware and computer instructions.

In addition, the various function modules in various embodiments of the present application may be integrated together to form a separate part, or the individual modules may stand alone, or two or more modules may be integrated to form a separate part.

The functions may be stored in a computer-readable storage medium if implemented as software function modules and sold or used as a separate product. Based on this, the technical solutions of the present application may be embodied in the form of a software product, which is essentially or in part a contribution to the prior art, or part of the technical solution may be embodied in the form of a software product. The computer program product is stored in a storage medium, and includes a series of instructions to make a computer device (a personal computer, a server, or a network device, etc.) to carry out all or part of the steps of the method described in the various embodiments of the present application. The aforementioned storage medium can store program codes, and can be a USB flash drive, a removable hard disk, a read-only memory (ROM), a random-access memory (RAM), a diskette or a compact disc.

Described above are merely various embodiments of the present application, but the scope of protection of the present application is not limited thereto. Any changes or substitutions within the scope of the technology disclosed in the present application can be easily obtained by one of ordinary skilled in the art, and shall be included in the scope of protection of the present application. Therefore, the scope of protection of the present application shall be defined by the claims.

What is claimed is:

1. A path tracking control method for an intelligent electric vehicle, comprising:
   determining a lateral stability state of a vehicle, wherein the lateral stability state comprises a stable state, a critical-destabilized state, and a destabilized state;
   performing path tracking control on the vehicle according to the lateral stability state of the vehicle;
   determining, when the vehicle is in the stable state, a front wheel steering increment of the vehicle; and determining a front wheel steering of the vehicle based on the front wheel steering increment of the vehicle;
   determining, when the vehicle is in the critical-destabilized state, a first yaw moment increment and an additional yaw moment weighting coefficient of the vehicle; determining a first additional yaw moment based on the first yaw moment increment and the additional yaw moment weighting coefficient; and determining a first longitudinal force on each wheel of the vehicle based on the first additional yaw moment; and
   determining, when the vehicle is in the destabilized state, a second yaw moment increment of the vehicle; determining a second additional yaw moment based on the second yaw moment increment; and determining a second longitudinal force on each wheel based on the second additional yaw moment;
   wherein the stable state is determined by $$0 < \left| \frac{1}{c}\dot{\beta} + \frac{k}{c}\beta \right| \leq \mu;$$

the critical-destabilized state is determined by $$\mu < \left| \frac{1}{c}\dot{\beta} + \frac{k}{c}\beta \right| \leq 1;$$

and
   the destabilized state is determined by $$\left| \frac{1}{c}\dot{\beta} + \frac{k}{c}\beta \right| > 1;$$

wherein $\beta$ represents a center-of-mass sideslip angle of the vehicle; $\dot{\beta}$ represents a center-of-mass sideslip angular velocity; k represents a slope; c is constant; and $\mu$ represents a road surface adhesion coefficient.

2. The path tracking control method of claim 1, wherein when the vehicle is in the stable state, the front wheel steering increment of the vehicle is determined through steps of:

constructing an objective function J:

$$\min J = \sum_{j=i+1}^{N_p} \eta(t+j\mid t) - \eta_{ref}(t+j\mid t)Q^2 + \sum_{i=0}^{N_c-1}\Delta u(t+i\mid t)R^2 + l\varepsilon^2;$$

wherein $N_p$ represents a prediction time domain; $N_c$ represents a control time domain; t represents a current moment; $\eta(t+j|t)$ represents a lateral position coordinate of the vehicle at a $(t+j)^{th}$ moment when the current moment is t; $\eta_{ref}(t+j|t)$ represents a reference value of the lateral position coordinate at the $(t+j)^{th}$ moment when the current moment is t; Q, R, and l represent weighting matrices of an output, a control increment, and a relaxation factor, respectively; E represents the relaxation factor; and $\Delta u(t+i|t)$ represents a front wheel steering increment of the vehicle at a $(t+i)^{th}$ moment when the current moment is t;

solving the objective function J; and determining a front wheel steering increment $\Delta u(t+i|t)$ of the vehicle at each moment within the control time domain when the objective function J reaches a minimum value; and acquiring a front wheel steering u(t) of the vehicle at the current moment t based on a front wheel steering increment $\Delta u(t+0|t)$ at a $(t+0)^{th}$ moment within the control time domain:

$$u(t)=u(t-1)+\Delta u(t+0|t).$$

3. The path tracking control method of claim 1, wherein when the vehicle is in the critical-destabilized state, the first yaw moment increment is determined through steps of:

constructing an objective function J:

$$\min J = \|Y(k) - Y_{ref}(k)\|_Q^2 + \|\Delta U(k)\|_R^2 =$$

$$\sum_{j=i+1}^{N_p}\|Y(k+j\mid k) - Y_{ref}(k+j\mid k)\|_Q^2 + \sum_{i=0}^{N_c-1}\|\Delta u(k+i\mid k)\|_R^2;$$

wherein $N_p$ represents a prediction time domain; $N_c$ represents a control time domain; Y(k) represents a predicted value of an output of the vehicle in the prediction time domain $N_p$; k represents a current moment; $Y_{ref}(\ )$ represents a reference value of the output; $\Delta U(k)$ represents a sequence of a yaw moment increment at a current moment k; $Y(k+j|k)$ represents a predicted value of the output at a $(k+j)^{th}$ moment when the current moment is k; $Y_{ref}(k+j|k)$ represents a reference value of the output at the $(k+j)^{th}$ moment when the current moment is k; $\Delta u(k+i|k)$ represents a yaw moment increment at a $(k+i)^{th}$ moment when the current moment is k; and Q and R represent weight matrices of the output and a control increment, respectively;

solving the objective function J; and determining the yaw moment increment $\Delta u(k+i|k)$ at each moment within the control time domain when the objective function J takes a minimum value.

4. The path tracking control method of claim 1, wherein when the vehicle is in the critical-destabilized state, the additional yaw moment weighting coefficient is determined through steps of:

constructing a coordination controller based on a reinforcement learning deep deterministic policy gradient (DDPG) algorithm, wherein state inputs are yaw velocity $w_r$, center-of-mass sideslip angle $\beta$, lateral displacement Y, heading angle $\varphi$, front wheel steering angle $\delta_f$, and lateral acceleration $\alpha_y$; and an action output is the additional yaw moment weighting coefficient $\alpha$;

wherein a reward function of the coordination controller is as follows:

$$r = r_1 + r_2 + r_3;$$

wherein $$r_1 = -\left(e_y^2 + e_\varphi^2\right) + C_1; r_2 = -\left|\frac{1}{c}\dot\beta + \frac{k}{c}\beta\right| + C_2;$$

$$r_3 = -|a_y| + C_3;$$

$e_y$ represents a deviation between an actual lateral displacement of the vehicle and a reference path; $e_\varphi$ represents a deviation between the heading angle and a reference heading angle; $\alpha_y$ represents a lateral acceleration of the vehicle; $C_1$, $C_2$ and $C_3$ are constant; c represents a coefficient; k represents a slope; $\dot\beta$ represents a center-of-mass sideslip angular velocity of the vehicle; and $\beta$ represents a center-of-mass sideslip angle of the vehicle.

5. The path tracking control method of claim 1, wherein the path tracking control is performed through steps of:

acquiring a yaw moment u(k) at a current moment k based on a yaw moment increment $\Delta u(k+0|k)$ at a $(k+0)^{th}$ moment within a control time domain;

wherein $u(k)=u(k-1)+\Delta u(k+0|k)$;

determining an additional yaw moment $\Delta M$ according to the yaw moment u(k) and the additional yaw moment weighting coefficient $\alpha$;

wherein $\Delta M=\alpha u(k)$; and determining a longitudinal force on each wheel of the vehicle based on the additional yaw moment $\Delta M$ in a drive-brake-combined manner.

6. The path tracking control method of claim 1, wherein when the vehicle is in the destabilized state, the second yaw moment increment of the vehicle is determined, and the path tracking control is performed based on the second yaw moment increment through steps of:

constructing an objective function J:

$$\min J = \|Y(k) - Y_{ref}(k)\|_Q^2 + \|\Delta U(k)\|_R^2 =$$

$$\sum_{j=i+1}^{N_p}\|Y(k+j\mid k) - Y_{ref}(k+j\mid k)\|_Q^2 + \sum_{i=0}^{N_c-1}\|\Delta u(k+i\mid k)\|_R^2;$$

wherein $N_p$ represents a prediction time domain; $N_c$ represents a control time domain; Y(k) represents a predicted value of an output of the vehicle in the prediction time domain $N_p$; k represents a current moment; $Y_{ref}(\ )$ represents a reference value of the output; $\Delta U(k)$ represents a sequence of a yaw moment increment at a current moment k; $Y(k+j|k)$ represents a predicted value of the output at a $(k+j)^{th}$ moment when the current moment is k; $Y_{ref}(k+j|k)$ represents a reference value of the output at the $(k+j)^{th}$ moment when the current moment is k; $\Delta u(k+i|k)$ represents a yaw moment increment at a $(k+i)^{th}$ moment when the current moment is k; and Q and R represent weight matrices of the output and a control increment, respectively;

solving the objective function J; and determining the yaw moment increment Δu(k+i|k) at each moment within the control time domain when the objective function J takes a minimum value;

acquiring a yaw moment u(k) at a current moment k based on a yaw moment increment Δu(k+0|k) at a $(k+0)^{th}$ moment within a control time domain;

wherein u(k)=u(k−1)+Δu(k+0|k);

determining an additional yaw moment ΔM according to the yaw moment u(k) and the additional yaw moment weighting coefficient α;

wherein ΔM=αu(k); and determining a longitudinal force on each wheel of the vehicle based on the additional yaw moment ΔM in a drive-brake-combined manner.

7. A path tracking control device for an intelligent electric vehicle, comprising:

a lateral stability state determination module; and a path tracking control module;

wherein the lateral stability state determination module is configured to determine a lateral stability state of a vehicle, wherein the lateral stability state comprises a stable state, a critical-destabilized state, and a destabilized state; and the path tracking control module is configured to perform path tracking control on the vehicle according to the lateral stability state of the vehicle, determine a front wheel steering increment of the vehicle when the vehicle is in the stable state, determine a front wheel steering of the vehicle based on the front wheel steering increment of the vehicle, determine a first yaw moment increment and an additional yaw moment weighting coefficient of the vehicle when the vehicle is in the critical-destabilized state, determine a first additional yaw moment based on the first yaw moment increment and the additional yaw moment weighting coefficient, determine a first longitudinal force on each wheel of the vehicle based on the first additional yaw moment, determine a second yaw moment increment of the vehicle when the vehicle is in the destabilized state, determine a second additional yaw moment based on the second yaw moment increment, and determine a second longitudinal force on each wheel based on the second additional yaw moment;

wherein the stable state is determined by $$0 < \left| \frac{1}{c}\dot{\beta} + \frac{k}{c}\beta \right| \leq \mu;$$

the critical-destabilized state is determined by $$\mu < \left| \frac{1}{c}\dot{\beta} + \frac{k}{c}\beta \right| \leq 1;$$

and
the destabilized state is determined by $$\left| \frac{1}{c}\dot{\beta} + \frac{k}{c}\beta \right| > 1;$$

wherein β represents a center-of-mass sideslip angle of the vehicle; $\dot{\beta}$ represents a center-of-mass sideslip angular velocity; k represents a slope; c is constant; and μ represents a road surface adhesion coefficient.

8. A computer-readable storage medium, wherein the computer-readable storage medium is configured to store a computer program; and the computer program is configured to be executed by a processor to implement the path tracking control method of claim 1.

9. A computer program product, comprising:

a computer program or a computer instruction;

wherein the computer program or the computer instruction is configured to be executed by a processor to implement the path tracking control method of claim 1.

* * * * *